United States Patent [19]
Phillips

[11] Patent Number: 5,989,648
[45] Date of Patent: Nov. 23, 1999

[54] PLASMA GENERATION OF SUPPORTED METAL CATALYSTS

[75] Inventor: Jonathan Phillips, State College, Pa.

[73] Assignee: The Penn State Research Foundation, University Park, Pa.

[21] Appl. No.: 09/072,741

[22] Filed: May 6, 1998

Related U.S. Application Data

[60] Provisional application No. 60/045,743, May 6, 1997, and provisional application No. 60/059,235, Sep. 18, 1997.

[51] Int. Cl.[6] .................................................. C23C 4/08
[52] U.S. Cl. .................... 427/456; 427/217; 427/250; 427/255.19; 427/255.25; 427/255.27; 427/255.395; 427/422; 427/427; 427/576; 427/580
[58] Field of Search .................................. 427/456, 476, 427/580, 217, 250, 255.19, 255.25, 255.27, 255.395, 422, 427

[56] References Cited

PUBLICATIONS

Rouleau, L., "A plasma–produced dispersed and disposable supported nickel catalyst for hydroconversion of heavy oils.," Applied Catalysis A: General, Elsevier Science Publishers (Amsterdam), pp. 149–159, (Jan. 18, 1993).

*Primary Examiner*—Bernard Pianalto
*Attorney, Agent, or Firm*—Thomas J. Monahan

[57] ABSTRACT

The present invention relates to a method of producing catalytic materials which comprises passing an aerosol comprising a mixture of metal powder and support through a plasma torch.

19 Claims, 10 Drawing Sheets

Pd/Al$_2$O$_3$, generated at 5 slm, tested at 35 °C (a) Pd/Al$_2$O$_3$, generated at 5 slm, tested at 35 °C
(b) Pd/C, generated at 5 slm, tested at 35 °C
(c) Pd/C, generated at 1.5 slm, tested at 35°C
(d) Conventional Pd/Al$_2$O$_3$, tested at 35 °C (a) Pd/C, generated at 5 slm, tested at 35 °C
(b) Pd/C, generated at 1.5 slm, tested at 35 °C

PLASMA GENERATION OF SUPPORTED METAL CATALYSTS

CROSS-REFERENCE TO RELATED APPLICATIONS

This application claims priority on provisional applications Ser. No. 60/045,743 filed on May 6, 1997, and Ser. No. 60/059,235 filed on Sep. 18, 1997 the entire contents of which are hereby incorporated by reference.

BACKGROUND OF THE INVENTION

1. Field of the Invention

The present invention relates to a method of producing catalytic materials and to catalytic materials produced by this method.

2. Description of the Prior Art

Among the most enduring paradigms of catalysis are the methods of supported metal catalyst production. For decades most of these materials have been made via variations on the time consuming and 'dirty' incipient wetness technique. High surface area materials are saturated with solvent (generally water) containing dissolved metal salts. The solvent is then evaporated and the salt decomposed by heating. In general the catalyst is then reduced. A relatively small number of supported metal catalysts are made by other classic techniques, in particular precipitation and ion exchange. Occasionally alternative approaches are explored. For example, following the lead of Parkyns (1) and others (2), a great deal of effort has gone into generating metal particles by partially/fully decomposing organometallic clusters. The approach has proven to be expensive and largely futile. The particles produced in that manner are generally found to be structurally and catalytically similar to those produced using the far less expensive incipient wetness method (3).

In the last two decades materials processing using plasmas has dramatically increased. A variety of plasma processing techniques are now employed in the production of virtually all integrated circuits. Plasmas are also used to improve 'materials' processing technology, for example, in the production of diamond films (4,5), as an alternative to flame techniques for the production of high quality titanium dioxide, and even to create polymer films with unique characteristics (6,7). Finally, plasma techniques have been employed with modest success to create truly novel materials, such as carbo-nitride films (8,9).

Yet, there is only a single prior example of the use of plasmas to create novel 'supported' catalytic materials (10) and this example is clearly not a 'model' process for general supported catalyst production. There are also a few examples of catalytic processes accelerated by plasmas (11), presumably via the (homogeneous) generation of radical species (12), as well as examples of plasmas 'activating' catalysts by removal of poisons or accelerating reduction (13–15). There are also examples of the use of plasmas to create thin support films (model catalysts) which are later metal impregnated using conventional 'wet' chemistry (16), and 'opposite examples' that is, systems in which plasmas spray metals onto conventionally prepared oxide films (17).

Only the single use of a plasma to create supported metal catalysts is of direct bearing on the present invention. The method employed in earlier work was significantly different from that proposed herein. Specifically, in the earlier work, catalysts were created by D-C discharge across a flowing stream of hydrocarbons. The discharge 'carbonized' some of the hydrocarbons and resulted in volatilization of metal (nickel) from the electrodes.

Particle production/treatment techniques in atmospheric plasmas can be broken into three categories: i) particle 'treatments' which do not involve a change in the particle chemistry, ii) particle production in which the final particles do not incorporate any of the gases used to 'fire' the plasma and iii) particle production in which the plasma gas phase is incorporated in the final structure. Film formation using plasmas operating at 'low' pressures (<100 Torr) are not relevant to the present invention. The focus of this invention is particle rather than film fabrication.

Reports on particle 'treatments' (category (i) above) are the most common. Most reports involve the use of commercial plasma torches, both DC arc and radio frequency, running on flowing inert gases (generally argon) to which metal particles are fed. The metal particles are often used to create high density films to coat other materials, often as some type of protective barrier. Some commercial processes in this category are thirty years old (18). Generally there is no attempt in this technology to modify the structure of the particles. The driving concept is simply to use the high energy density of plasmas to 'melt' the particles such that the metal can adopt the form of the target surface upon impact/quenching (19,20). There have been instances in which the technology has been employed to create structures somewhat different from the original feed. For example, it was recently demonstrated that if two torches, each with a different material, are run to spray the same surface simultaneously, the result is a form of 'laminated' film (7,21). In fact, there are several examples of the use of particle fed torches to create films with an intimate 'atomic scale' mixing of the two materials (19,22,23).

The most relevant work is metal evaporation in plasmas. Repeatedly it has been found that metal particles are completely atomized in atmospheric pressure torches. One group injected pure iron and aluminum powders in the micron size range into a high power (32 kW) thermal arc plasma at the rate of about 5 gms/min. In the plasma it was presumed that the original particles completely evaporated and new particles on the order of 100 nm in size nucleated and grew in the afterglow (24). Other groups have also recently shown that micron sized iron particles are atomized during passage through a torch (25). The particles which are captured and examined are presumed to form by nucleation and growth of atomic species in the afterglow region.

There are a variety of methods that have been employed to make category II particles (26). One method is to sputter a target metal with a flowing, but chemically inert plasma (e.g. Argon). The particles are then collected downstream using filters, etc. Another method is to make solid, well mixed, beds consisting of two materials. These mixtures are converted to alloys, in particulate form, in gas (no flow) thermal plasma systems. In particular there have been a number of reports on the generation of carbides in this manner (27). Yet another example of the use of plasmas to make particles involves injecting molecular species into a plasma. In the hot zone of the plasma the original molecule is destroyed, and particles probably form in the afterglow during cooling. In our own laboratory, we created iron nanoparticles by injecting an aerosol stream containing liquefied ferrocene into a low pressure microwave generated (argon or hydrogen) plasma (28).

The greatest number of reports in which particles are created by some complex chemistry in the plasma zone (category III) involve the creation of carbides and nitrides.

Research in this area is driven by the perception that carbide or nitride production using plasma technology has solid commercial potential.

In our own laboratory (unpublished), we have succeeded in creating aluminum nitride particles by injecting 1 micron aluminum particles through the center of a nitrogen plasma generated using our torch. Other groups did similar work at a much earlier date. Indeed, Vissokov and Brakalov did nearly identical work (29). They postulated that the original aluminum particles were completely atomized, and that AlN particles formed during rapid nucleation and growth in the rapid cooling region of the afterglow. This analysis is consistent with the findings (both theirs and ours) that the final AlN particles are orders of magnitude smaller, on a volume basis, than the input aluminum particles. Other workers made AlN from aluminum particles and ammonia (30,31).

There are numerous examples of methods to create carbides (15,27,32,33) and plasma methods are said to be both significantly faster and more energy efficient than alternative fabrication techniques. One of the more relevant methods involves the injection of particles into a plasma torch operating at atmospheric pressure which contains hydrocarbon molecules. According to the inventors of this technology (34) the metal particles (e.g., Ti, Mg, Si) completely atomize in the hot plasma region and then in the cooling afterglow, nucleate new particles which incorporate carbon atoms created during the decomposition of the hydrocarbon molecules.

In view of the above review of prior art, there is no evidence in prior literature of the use of plasma torches to create traditional supported metal catalysts, although there is a considerable history of the use of plasma torches to atomize metal particles.

Further, there is considerable interest in the use of plasma treatments to sinter micron scale oxide particles together to form high density solids. The impetus for this interest was the finding by Bennett and co-workers (35) that in plasmas, alumina compacts more rapidly and at significantly lower temperatures than it compacts when treated thermally. Since that time several groups have confirmed that plasma processing accelerates the sintering of alumina and other oxides (36–38).

SUMMARY OF THE INVENTION

An object of the invention is to create supported catalysts by passing aerosols containing metal particles (which will atomize) and traditional support materials through a pressure torch preferably at atmospheric pressure. Thus, the present invention relates to a method of producing catalytic materials which comprises passing an aerosol comprising a mixture of at least one metal powder and at least one support through a plasma torch. Therefore, the present invention provides a novel, and radically different method for the production of supported metal catalysts.

BRIEF DESCRIPTION OF THE DRAWINGS

The present invention will become more fully understood from the detailed description given hereinbelow, and the accompanying drawings which are given by way of illustration only, and thus are not limitative of the present invention, and wherein.

DETAILED DESCRIPTION OF THE INVENTION

Figure 1:
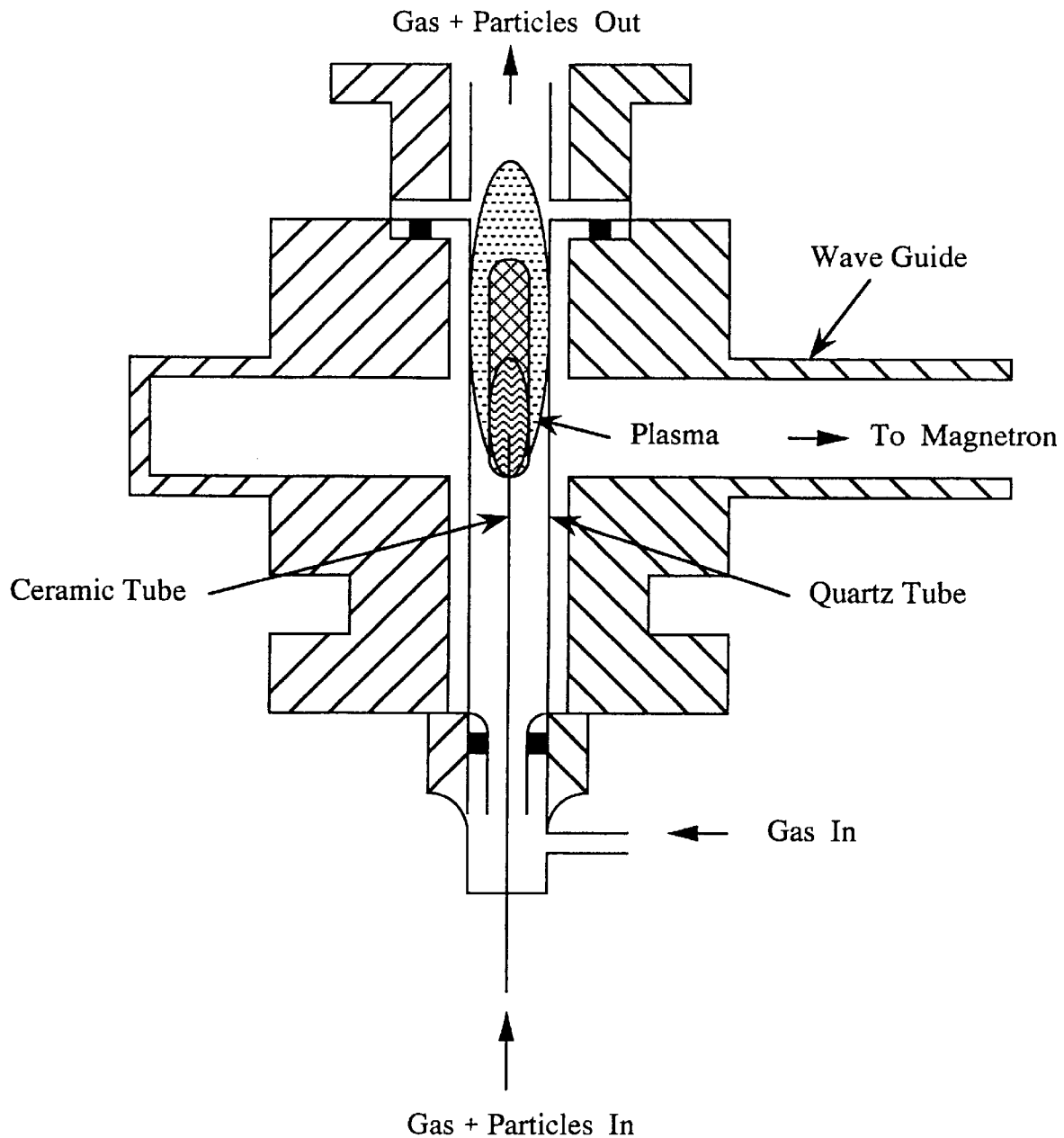
FIG. 1 is a drawing of an atmospheric pressure plasma torch.

A plasma torch is used to create supported metal catalysts from physical mixtures of any type of metal or metal mixture (e.g. at least one of platinum (Pt), palladium (Pd), iron (Fe), vanadium (V), chromium (Cr), manganese (Mn), cobalt (Co), nickel (Ni), copper (Cu), zinc (Zn), ruthenium (Ru), rhodum (Rh), silver (Ag), osmium (Os), iridium (Ir), gold (Au)) and at least traditional support material (e.g. silica, alumina, carbon, magnesia, titania, ceria, niobia, praseolymium oxide, lanthanum oxide, high surface area (>5 $m^2$/gm) carbides and nitrides). The metal powder is preferably present in an amount of 0.01 to 80 wt %, more preferably 0.1 to 2.5 wt %, and most preferably 0.5 to 1.0 wt %. The size of the metal powder is preferably 0.05 to 500 microns, more preferably 0.1 to 10 microns, and most preferably 0.5 to 5 microns. The support material is preferably present in an amount of 20 to 99.99 wt %, more preferably 75 to 99.9 wt %, and most preferably 99.5 to 90 wt %. The size of the support material is preferably 0.01 to 1000 microns, preferably 0.1 to 200 microns, and most preferably 1 to 10 microns. The power to the torch is preferably 100 to 10,000 watts, more preferably 250 to 3000 watts, and most preferably 300 to 1500 watts. The pressure torch is preferably operated at atmospheric pressure, but it may be operated at pressures in the range of 10 Torr to 5 atm, or even 1 Torr to 30 atom. The total flow rate of aerosol and plasma gas is preferably 1 to 5000 standard liters/min. and more preferably 1 to 20 standard liters/min. The ratio of aerosol gas to plasma gas is preferably 1 to 1000, more preferably 1 to 100, and most preferably 1 to 1. The average residence time of the aerosol in the applicator is 0.001 to 1000 sec.

Any of the many techniques for generating aerosols can be used. Charles Norman Davis, "Aerosol Science," Academic Press (1966). The preferred methods should preferably use a dry aerosol containing less than 0.01 to 80 volume percent solid, more preferably 0.5 to 25 volume percent solid, and most preferably 0.5 to 10 volume percent solids. However, "wet" aerosols (that is aerosols containing some liquid phase in the form of small droplets) and aerosols containing higher volume fraction solids may be employed.

More specifically, aerosols containing particles of metal and support materials in appropriate (i.e. mass) ratios (ca. 1:99 metal to support) are injected into the center of an atmospheric pressure plasma generated with a commercial direct current, radio frequency or microwave torch. Any type of gas that can be used to generate a plasma can be used. Thus, the gases used to generate the plasma can be varied. Gases commonly used in conjunction with this invention include oxygen, hydrogen, helium and nitrogen, preferably argon. Other gases which may be used include fluorine, chlorine, neon, krypton and xenon. Gas mixtures containing at least two gases (e.g. Ar/$H_2$) may be employed as well.

Catalytic studies (selective hydrogenation of 1-butene) indicate that catalysts created in this novel fashion have activities similar to catalysts of the same composition created using conventional methods. In all cases the selectivity toward isomerization rather than hydrogenation of plasma generated catalysts was found to be superior to those of the commercial catalysts for isomerization. Characterization studies suggest that the catalysts consist of nano-scale metal particles on highly modified support material.

Accordingly, as exemplified below in the Examples, catalytic materials were manufactured by passing an aerosol comprising a mixture of at least one metal powder and at least one conventional support material, carried by plasma gas (e.g. argon), through a microwave powered plasma torch. The underlying concept behind the approach is simple. It is known that some small (micron or less) metal particles passed through a microwave or radio frequency generated atmospheric pressure plasma are totally 'atomized' in a time of the order of 0.001 second (25,29). This is due to the very high temperatures, now believed to be of the order of 3000 K (39,40), found in the center of the plasma. Thus, in a mixture of metal particles and support materials, it is hypothesized that metal atoms, generated during the atomization of the input particles, will coat the (i.e. refractory) support material. In the present invention, the metal powder may partially atomize when passing through the plasma torch and coats the support, or small clusters of atoms may be formed. Particles will nucleate and grow on the surface of the (refractory) support as the particles flow into the cooler regions of the afterglow. Cooling is extremely rapid in the afterglow (e.g. $10^5$ degree/second or more), thus excessive sintering is unlikely.

It is understood that the point of injection of the solid aerosol(s) into the plasma torch is variable. In the examples described hereinbelow the aerosol was injected into the hottest section of plasma and then carried through the afterglow and finally into the coolest zone. A variation of the invention is to change the injection point of the aerosol. For example, the aerosol can be injected into the afterglow directly, thus bypassing the hottest zone of the plasma. Another variation of the invention is to divide the aerosol into two (or more) components. For example, one component (or more) can be injected through the hottest section of the torch, and a second component (or more) can be injected into the afterglow.

Another variation is in the composition of the mixtures. The final aerosol(s) can comprise mixtures containing several supports (e.g. alumina and ceria) and several metals (e.g. Rh and Pt). In fact, commercial catalysts frequently contain several metals and several "support" oxides (e.g. 3-way automobile catalysts).

In brief, catalysts were generated using a truly novel technique and then characterized with a number of techniques including x-ray diffraction, microcalorimetry, surface area measurements (BET), scanning electron microscopy, and chemical analysis. Also, as catalytic materials were manufactured by passing an aerosol, which is a mixture of metal powder and conventional support materials, through a plasma torch, the influence of applied power and to a limited extent flow rate on catalyst structure/chemistry was studied. The catalytic materials so created were tested for their catalytic behavior for selective hydrogenation of 1-butene.

It is interesting at this point to reflect on cost issues as one common, generally inappropriate, objection to plasma synthesis is its "high cost". On average, it was found that 200 mg of aerosol/hr can be treated, and thus 1 mg of palladium/hr. Thus, the hourly cost of palladium was $0.12. Assuming that the power supply required 1 kW to deliver 700 W of power, and given the cost of electricity paid by PSU is $0.10/kW hr., it cost only $0.10 to process 200 mg of palladium.

The following examples are provided for a further understanding of the invention, however, the invention is not to be construed as being limited thereto.

EXAMPLES

Alumina and carbon supported palladium catalysts have been created in a unique fashion using a microwave powered atmospheric pressure argon plasma. All were generated from aerosols containing 0.5 weight percent palladium powders (average size 1 micron, 99.95% purity from Goodfellow) and 99.5 weight percent of a support material. The only difference in the starting materials was the identity of the support material. In some cases, either ground alumina (Grace Chemical, 15 $\mu$, 99.9% purity) was used, in the rest ground carbon (Norit C, 20 $\mu$) was employed.

In each case the aerosol was passed through a plasma torch (Astex) operated at between 300 and 1000 Watts, with <40 W/reflected power (FIG. 1). In fact, two feed streams were passed through the torch. One feed stream consisted of pure argon (MG Industries 99.95% purity) fed at either 1.5 slpm or 6 slpm to the 'outer shell' of the 2.5 cm ID quartz torch. The second stream was of 1 slpm or less and contained the aerosol (approx. 200 mg solid/hr). This stream was fed through a 3 mm ID alumina tube to the center point of the microwave applicator. Great efforts were employed to insure the resulting jet was at the center of the torch. It was estimated on the basis of the volumetric flow rate and estimated temperature of the gas in the applicator region that the average residence time of the particles in the 'field region' of the applicator was no more than 0.1 seconds. It is known that cooling (18,41) in the afterglows of torches of the type employed is very rapid ($10^5$ °K/sec), so it is reasonable as a first approximation to assume that melting/atomization occurs in the coupler region and that cooling leading to nucleation and growth occurs in the afterglow region.

The aerosol particles escaping from the torch were captured either in a 'particle trap' at the top of a 'chimney' (5 cm diameter, by 20 cm height) placed loosely over the top of the torch, or were captured in filter paper (Cole Parmer, 0.2 $\mu$ PTFE) placed between the end of the chimney and a chemical pump with a capacity of 50 slpm.

To date six techniques have been employed in analysis of the materials generated with the plasma torch: Chemical composition using ICP, catalytic activity for selective hydrogenation of 1-butene, scanning electron microscopy (SEM), x-ray diffraction (XRD) microcalorimetry and total surface area measurements (BET). Together the inventor has found using these techniques that the plasma torch process generates materials which have both similarities and differences with supported catalysts created with traditional techniques.

Example I—Alumina Supports

Ten novel catalysts were generated by passing aerosols consisting of alumina (99.5 wt %) and palladium particles (0.5 wt %) through an argon plasma generated in a microwave torch.

Figure 2:
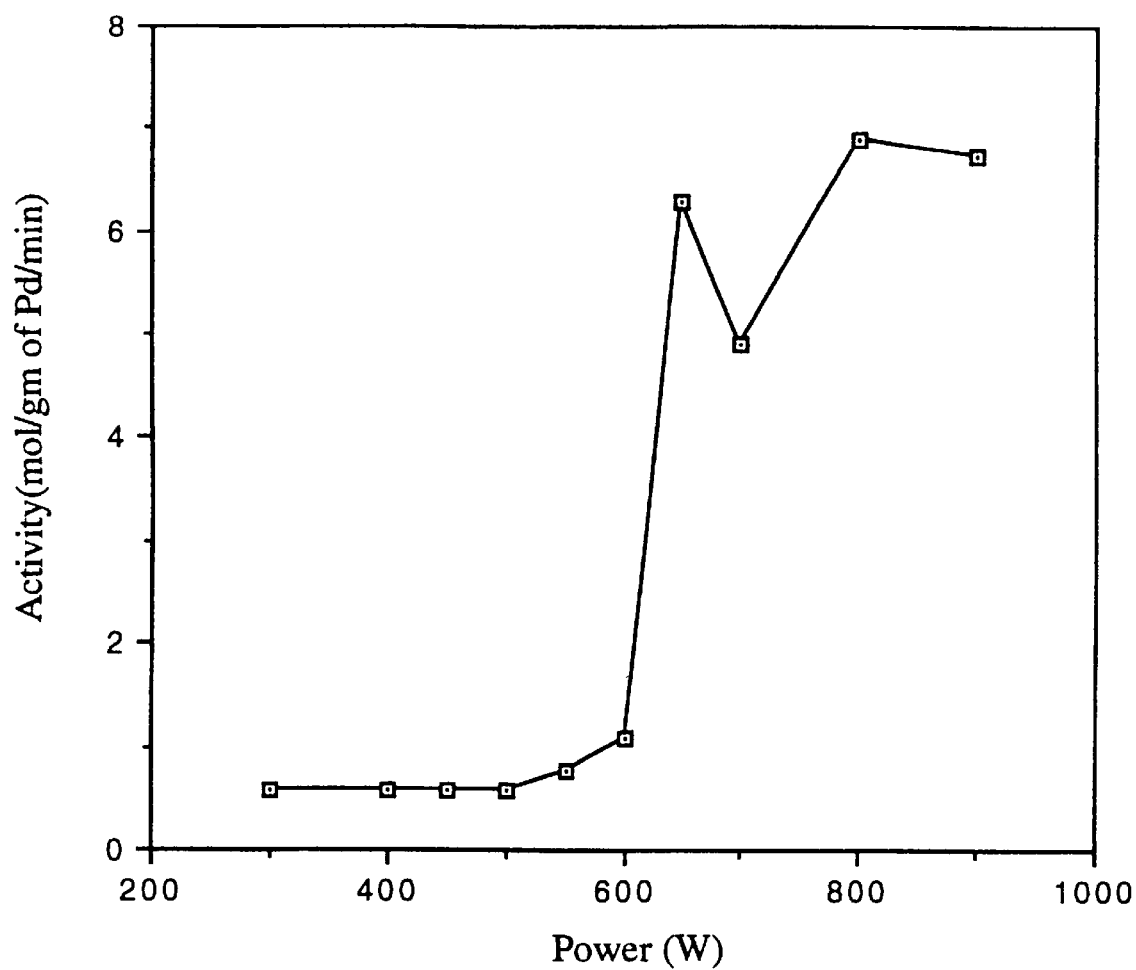
FIG. 2 is a graph of power versus activity for Pd/Alumina.
Figure 3:
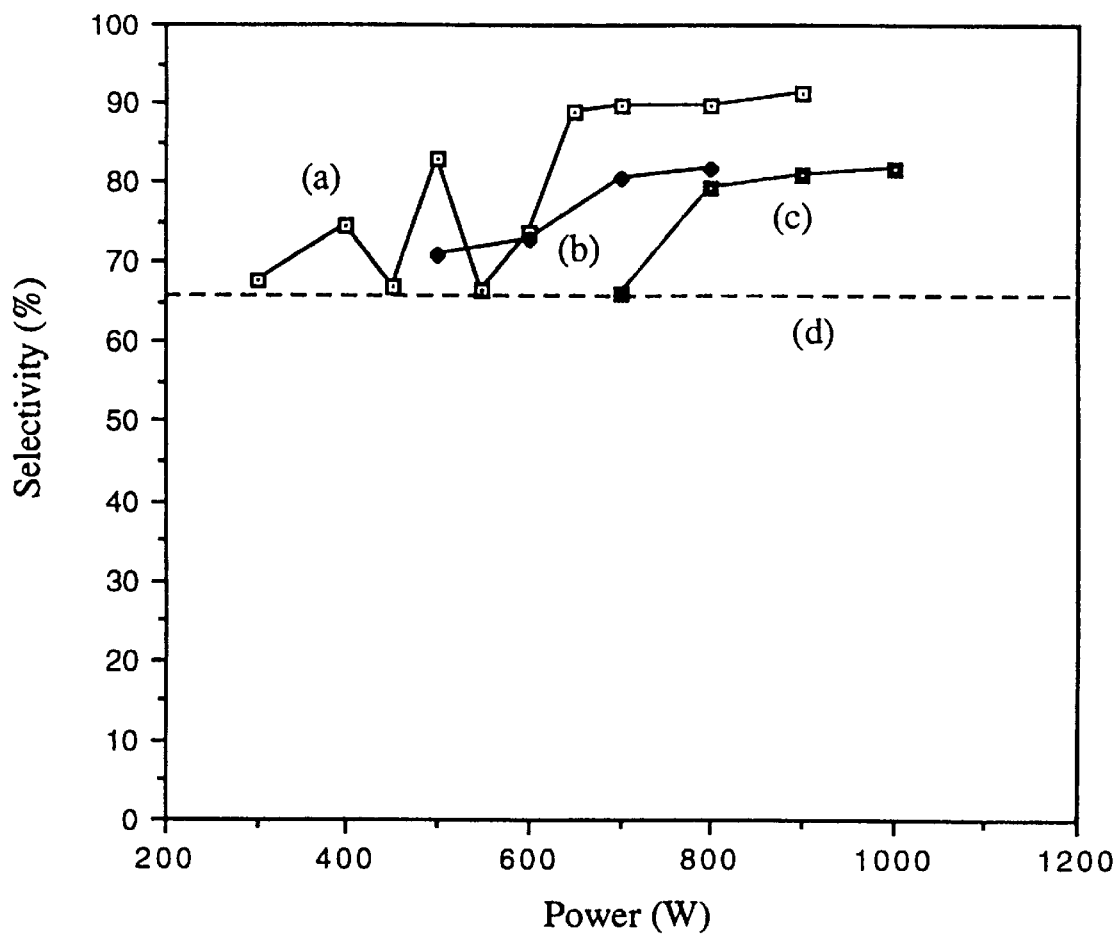
FIG. 3 is a graph of power versus selectivity for various types of Pd/$Al_2O_3$ and Pd/C.

Particularly exciting are results which show a clear pattern of activity for alumina supported catalysts. For these catalysts, activity is a function of applied microwave power (FIG. 2). Selectivities were very high in all cases (FIG. 3) (Table I).

TABLE I

| Catalyst | Temperature (° C.) | 1-butene Conversion (mol/gm of Pd/min) | Selectivity(%) |
|---|---|---|---|
| Pd/Al$_2$O$_3$ (300 W, 5 slm) | 35 | 0.6 | 68 |
| Pd/Al$_2$O$_3$ (400 W, 5 slm) | 35 | 0.6 | 75 |
| Pd/Al$_2$O$_3$ (450 W, 5 slm) | 35 | 0.6 | 67 |
| Pd/Al$_2$O$_3$ (500 W, 5 slm) | 35 | 0.6 | 83 |
| Pd/Al$_2$O$_3$ (550 W, 5 slm) | 35 | 0.8 | 66 |
| Pd/Al$_2$O$_3$ (600 W, 5 slm) | 35 | 1.1 | 74 |
| Pd/Al$_2$O$_3$ (650 W, 5 slm) | 35 | 6.3 | 89 |
| Pd/Al$_2$O$_3$ (700 W, 5 slm) | 35 | 4.9 | 90 |
| Pd/Al$_2$O$_3$ (800 W, 5 slm) | 35 | 6.9 | 90 |
| Pd/Al$_2$O$_3$ (900 W, 5 slm) | 35 | 6.7 | 91 |
| Pd/Al$_2$O$_3$, generated using Incipient Wetness Method | 35 | 74.2 | 65 |
| Physical Mixture of Pd and Al$_2$O$_3$ | 35 | 0.077 | 64 |
| Pure Al$_2$O$_3$ (800 W, 5 slm) | 35 | 0.00011 *(mol/gm of Al$_2$O$_3$/min) | 66 |
| Pd/C (500 W, 5 slm) | 35 | 0.4 | 71 |
| Pd/C (600 W, 5 slm) | 35 | 0.3 | 73 |
| Pd/C (700 W, 5 slm) | 35 | 0.7 | 80 |
| Pd/C (800 W, 5 slm) | 35 | 2.4 | 82 |
| Pd/C (700 W, 1.5 slm) | 35 | 12.9 | 66 |
| Pd/C (800 W, 1.5 slm) | 35 | 21.5 | 79 |
| Pd/C (900 W, 1.5 slm) | 35 | 17.1 | 81 |
| Pd/C (1000 W, 1.5 slm) | 35 | 14.4 | 82 |
| Pd/C, generated using Incipient Wetness Method | 35 | 0.5 | 58 |

This can be explained qualitatively with a simple model. At low power the palladium is not fully atomized and hence high dispersion is not achieved.

Figure 4A:
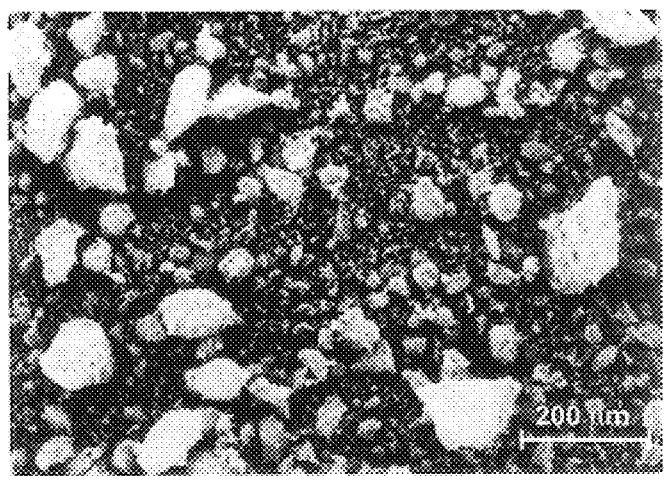
FIG. 4a, b and c is SEM of $Al_2O_3$ before plasma and post plasma.
Figure 4B:
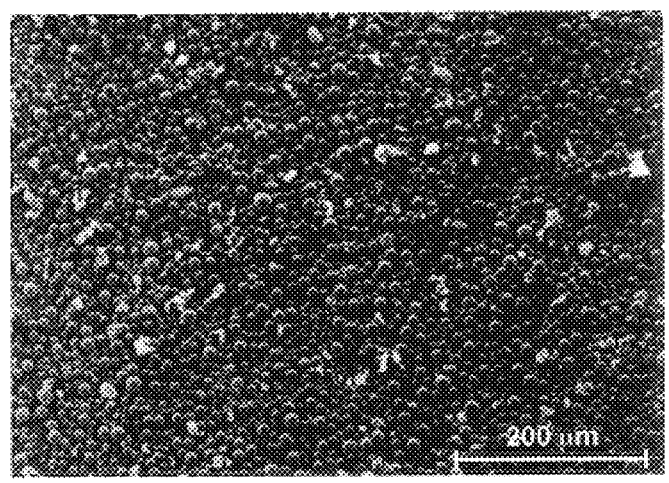
Figure 4C:
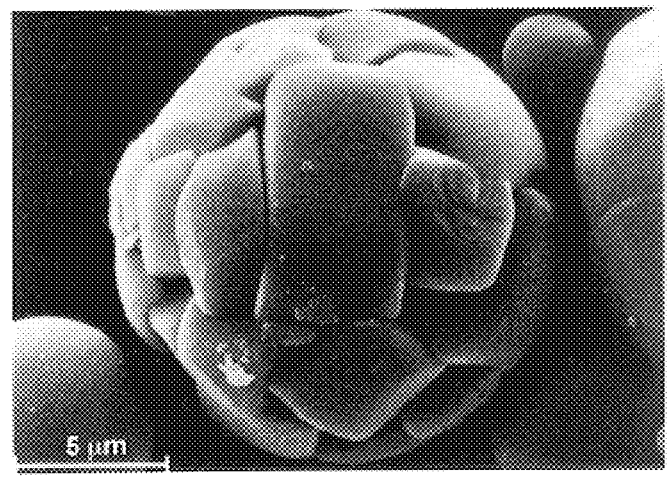

At high power the alumina "melts" and forms spherical pellets (FIG. 4) with virtually no surface area (Table II).

TABLE II

Surface Area of Pd/Al$_2$O$_3$

| Power (W) | Surface Area (m$^2$/gm) |
|---|---|
| 300 | 85 |
| 400 | 78 |
| 450 | 79 |
| 500 | 64 |
| 550 | 69 |
| 600 | 50 |
| 650 | 49 |
| 700 | 26 |
| 800 | 16 |
| Original Pd/Al$_2$O$_3$ | 86 |

Over a relatively narrow range of plasma operating power does the palladium atomize, and the alumina maintain a high surface area. Over this range of power both high dispersions and high activities are achieved.

Figure 5A:
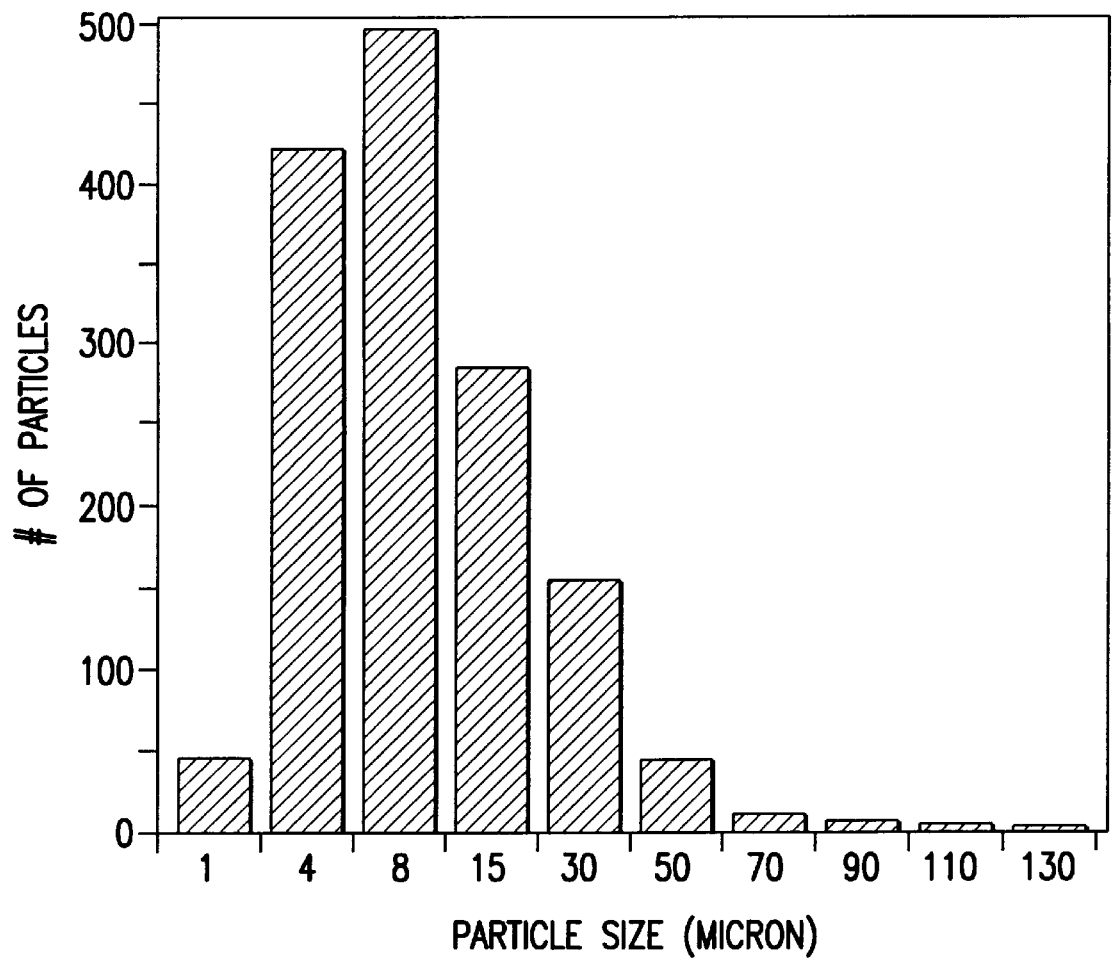
FIG. 5a, b and c shows particle size distribution for (a) precursor alumina, (b) alumina post 800 W plasma and (c) alumina post 1000 W plasma.
Figure 5B:
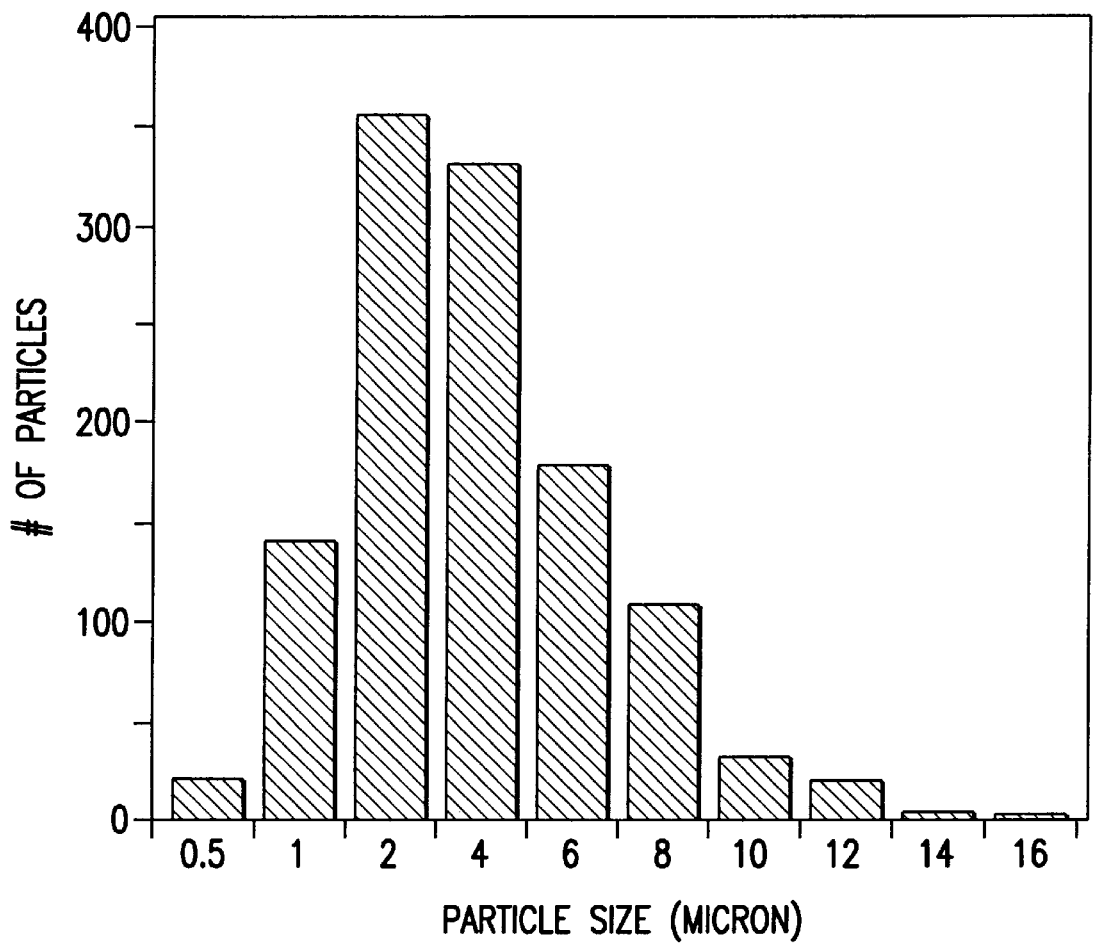
Figure 5C:
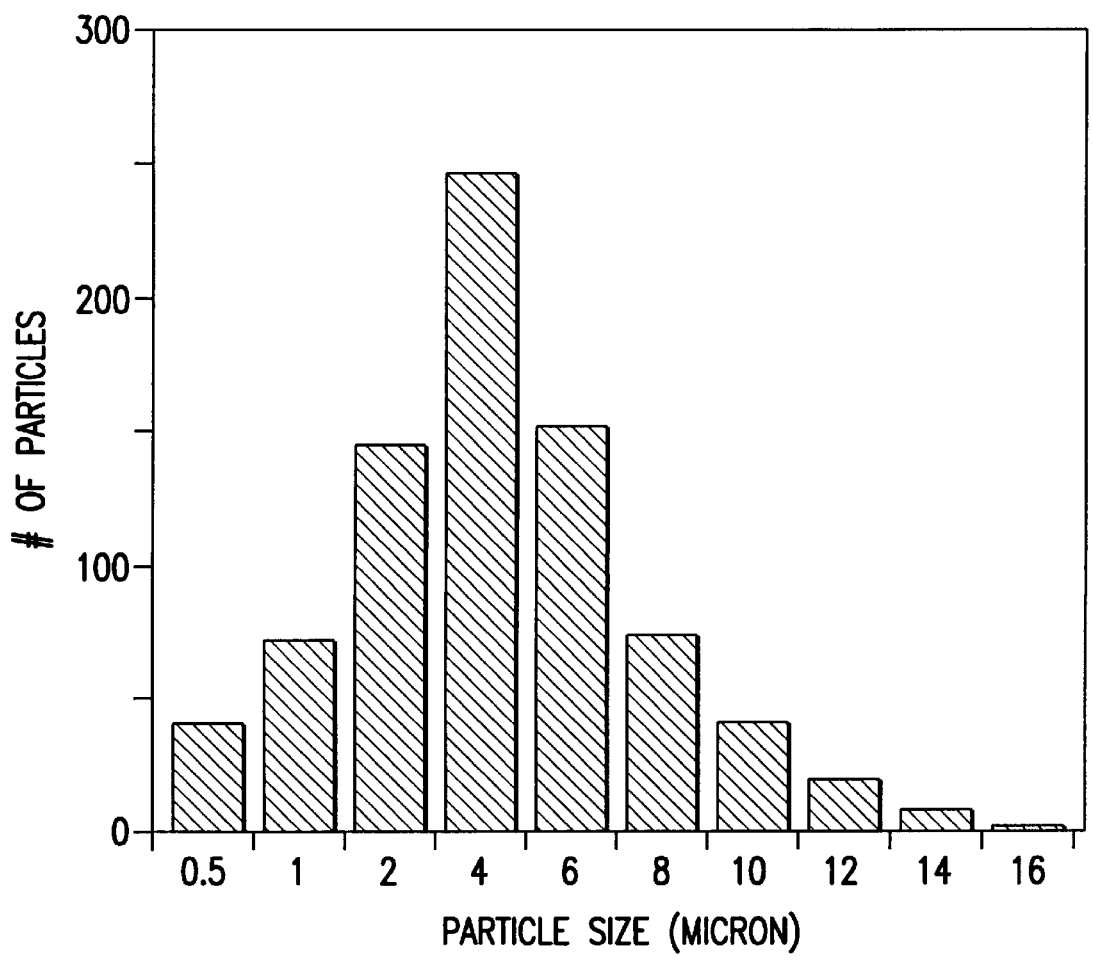
Figure 6A:
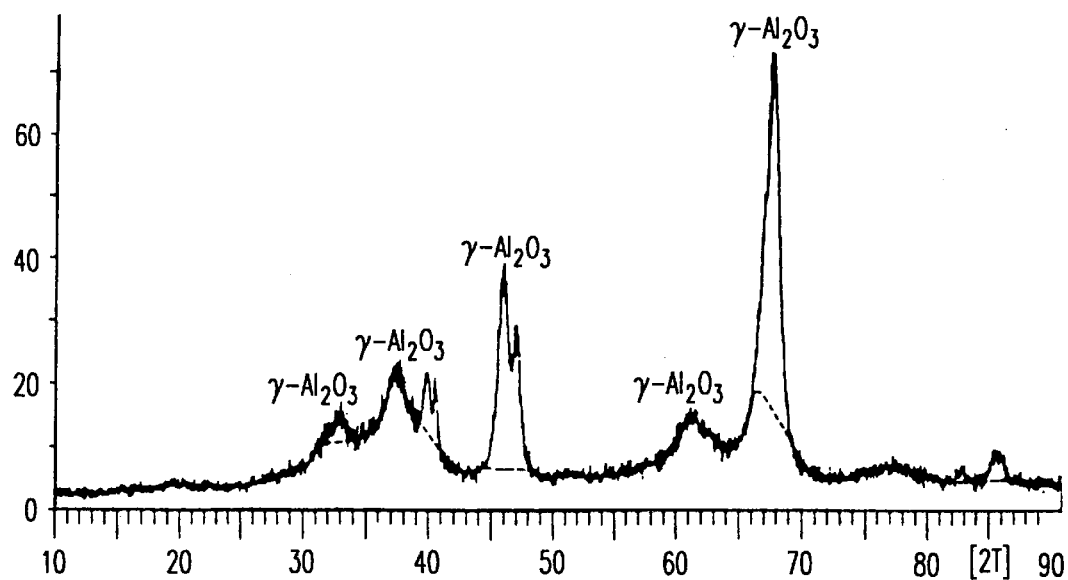
FIG. 6 is XRD of $Al_2O_3$.
Figure 6B:
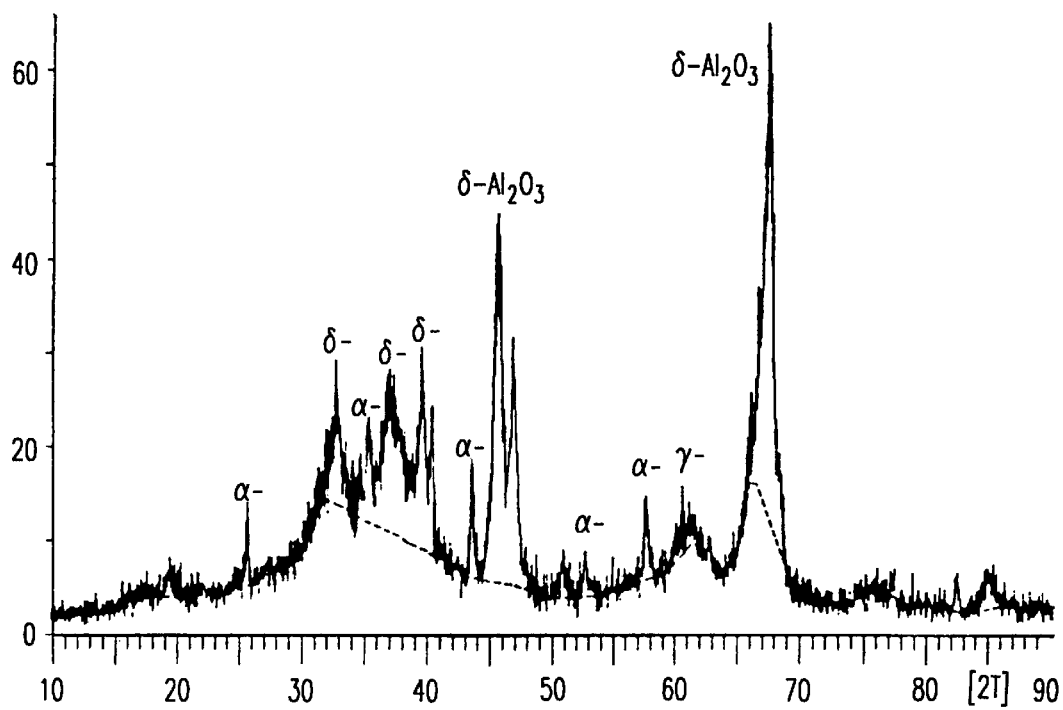
Figure 6C:
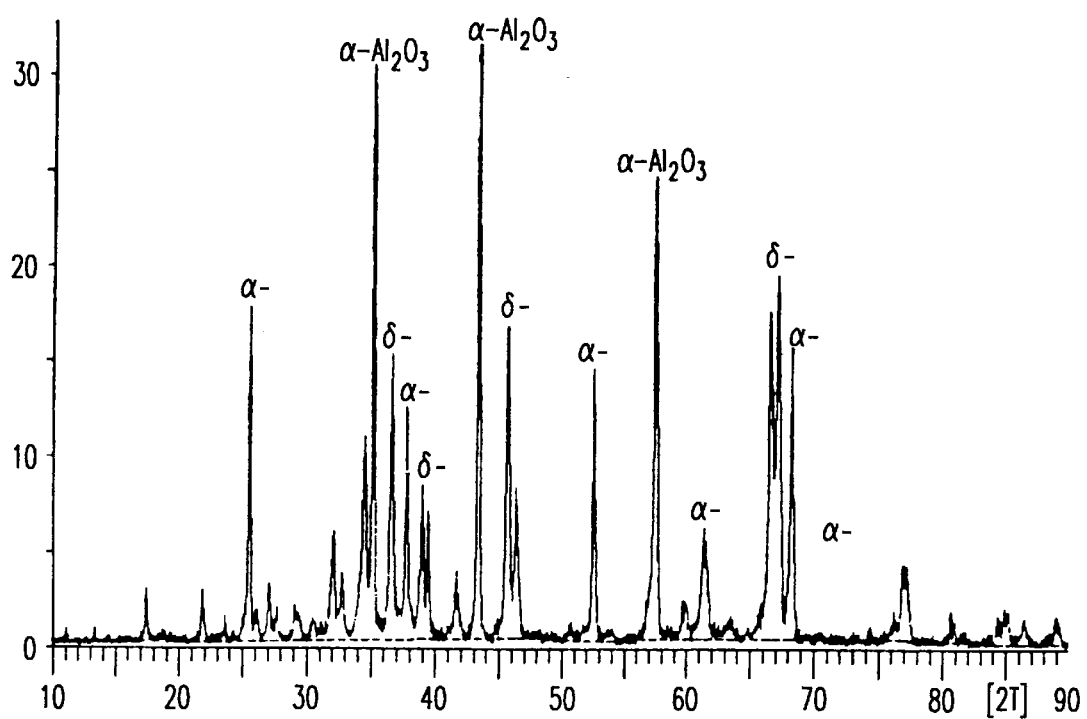

Both SEM and x-ray studies support the supposition that at operating powers greater than about 400 watts the alumina melts and recrystallizes. The SEM photos (FIG. 4a, b and c) show that the particles become spherical in shape and that the average particle diameter is reduced by a factor slightly greater than two (FIG. 4a, b and c) after passage through plasmas operating at 600 watts or greater. It is expected highly porous (~75% voids) γ-alumina would form spheres and become denser following melting. XRD results (FIG. 5a, b and c) showing that the plasma treatment at high power changes the alumina to mixtures of corundum (α-alumina) and δ-alumina also are expected for particles melted in the plasma zone and then recrystallized in the cooler afterglow. Moreover, the particles are clearly better crystallized (sharp lines) an the original γ-alumina.

Another issue is metal loss. Specifically metal loss by diffusion and thermophoresis can be eliminated by maintaining a high ratio of plasma gas to aerosol gas. If this ratio is allowed to decrease, a significant fraction of the input metal is lost. However, under the conditions employed in these Examples, metal loss was found to be virtually zero.

Changes in selectivity are potentially valuable. Often times selectivity, not activity, determines the value of a catalytic material. The current example, 1-butene hydrogenation/isomerization, is instructive in this regard. Commercially, C$_4$ streams in refineries are often 'selectively hydrogenated' in order to convert 1-butene and butadiene into 2-butene. This improves the lifetime of the catalytic acids used in subsequent alkylation, as well as enhancing the octane of the alkylate. The selective hydrogenation is generally performed at high pressures in order to liquefy the C$_4$ stream and keep the hydrogen content in the active phase (liquid) low. Only at low hydrogen concentrations is isomerization rather than hydrogenation (butane) favored. Ideally, one would prefer catalysts which are selective even at higher hydrogen concentrations so that liquefaction is not required. Thus, it is notable (FIG. 3) that in all cases the isomerization selectivity was distinctly higher than that of the commercial catalysts. The improved isomerization selectivity at high hydrogen concentration of the novel plasma catalysts, relative to the commercial catalysts, is potentially of significant value.

From x-ray diffraction there is evidence that the plasma treatment resulted in the presence of additional oxide phases in the case of alumina. For example, only γ-alumina was initially present, but after treatment it is evident that several phases including δ and corundum are present as well. Moreover, it is evident that the size of both the alumina and silica particles is significantly smaller after the plasma treatment. As shown in FIGS. 9a–c and 10 the size and shape of alumina particles before and after passage through the torch is significantly different. Indeed, prior to passage through the torch the particles are irregular in shape, have a bimodal distribution with an average particle size (by mass) of about 50 microns, whereas, after passage through the torch there is a monomodal distribution of spherical particles, and the average size is about 6 microns.

Example 2—Carbon Supported Catalysts

Eight novel supported Pd catalysts were generated on a high surface area activated carbon using the plasma torch method as described above.

Figure 7:
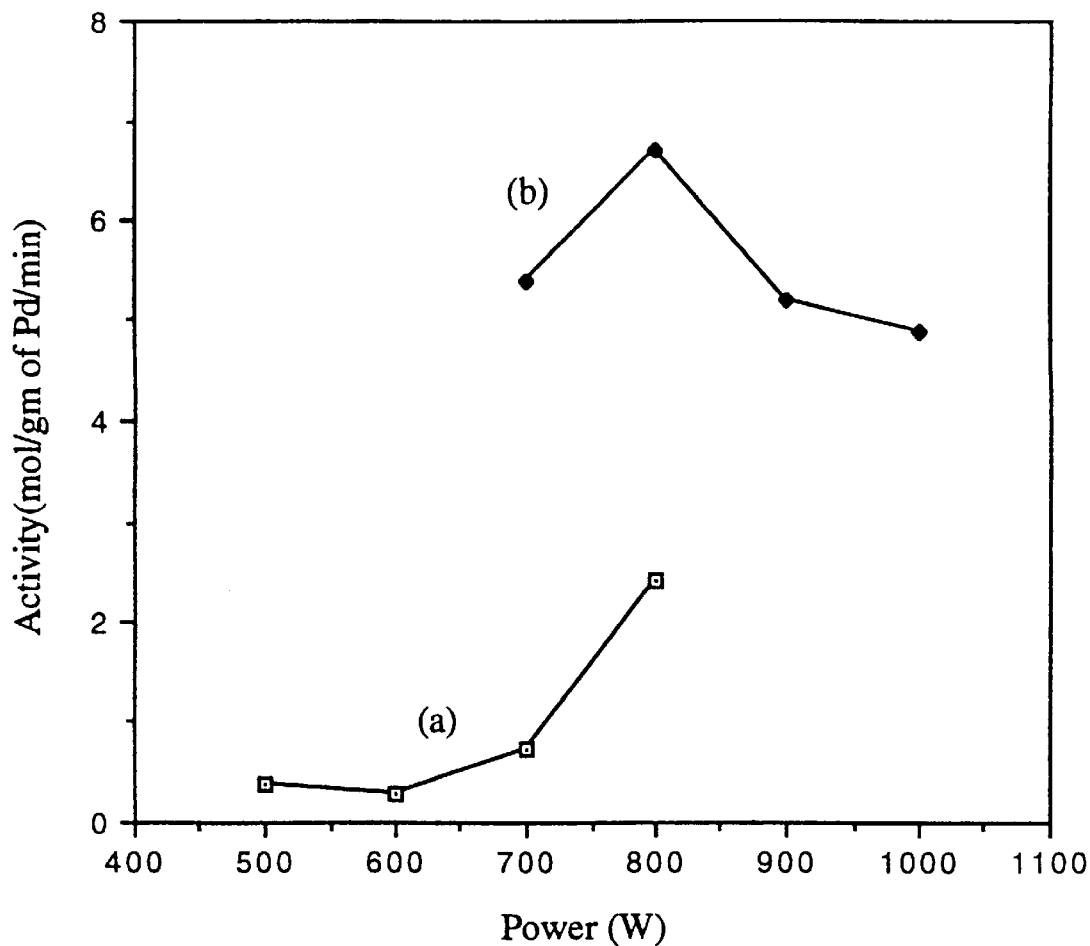
FIG. 7 is power versus activity for Pd/C.

An exciting result was the finding that on carbon supports catalysts with extremely high activities higher than on alumina could be produced. The data of Tables I and FIG. 7 show carbon supports that where power and larger residence time increase activity of the product catalyst. This probably results since (i) carbon surface area is not reduced by the plasma treatment, (ii) plasma treatment creates "active sites", allowing stronger metal-carbon bonds to form in the afterglow and (iii) longer residence times leads to greater atomization of the input metal.

All cited patents and publications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

REFERENCES

1. N. D. Parkyns, "Proc. of the third Int. Cong. or Cat.," (W. H. M. Sachtler, G. C. A. Schmit and P. Z. Wietering, eds.) pg. 914, North Holland, Amsterdam (1965).
2. R. L. Burwell, Jr. and A. Brenner in "Catalysis, Heterogeneous and Homogeneous," B. Delmon and G. Jannes, eds.O p. 157, Elsevier, Amsterdam (1975).
3. J. Phillips and J. A. Dumesic, Apl. Catal. 9, 1 (1984).
4. J. C. Angus and C. C. Hayman, Science 241, 913 (1988).
5. M. Frenklach, R. Kematick, D. Huang, W. Howard, K. E. Spear, A. W. Phelps and R. Koba, J. Appl. Phys. 66, 395 (1989).
6. H. Yasuda, "Plasma Polymerization", Academic Press, Orlando (1985).
7. H. Biederman and Y. Osada, "Plasma Polymerization Processes," Elsevier, Amsterdam (1992).
8. A. Y. Liu and M. L. Cohen, Science 245, 841 (1989).
9. H.-X. Han and B. J. Feldman, Solid State Commun. 65, 921 (1988).
10. L. Rouleau, R. Bacand and M. Breysse, Appl. Catal A. 104, 137 (1993).
11. L. O'Hare U.S. Pat. No. 4,877,589 and U.S. Pat. No. 4,451,436.
12. M. B. Kizlmg and J. G. Jaras, Appl. Catal. A. 147, 1 (1996).
13. B. Horvath, U.S. Pat. No. 3,485,771.
14. T. M. Maesen, H. W. Kouwenhaven, H. Van Bekkum, B. Sulikowshi and J. Klinawshi, J. Chem. Soc. Faraday Trans. 86, 3967 (1990).
15. G. P. Vissokov, T. M. Peev, I. Czako-Nagy and A. Verles, Appl. Catal. 27, 257 (1986).
16. D. E. Halverson and D. L. Cocke, J. Vac Sci & . A 7, 40 (1989).
17. H. R. Khan, H. Frey, J. of Alloys and Compounds 190, 209 (1993).
18. M. J. Boulos, P. Fauchais, and E. Pfender, "Thermal Plasmas: Fundamentals and Applications. Vol. I," Plenum Press, NY (1994).
19. T. N. Meyer, J. R. Auhl, A. I. Kahveci, S. J. Jones and L. M. Angers in "Plasma Processing and Synthesis of Materials," (Materials Research Society Symposium Proceedings, Vol 110) (D. Aperian and J. Szelky, eds) Materials Research Society, Pittsburgh, Pa. (1990) pg. 23.
20. T. Yoshida and K. Akashi, J. Appl. Phys. 48, 2252 (1977).
21. A. M. Ritter, J. R. Rairden and R. L. Mehan, in "Plasma Processing and Synthesis of Materials III", (D. Apelain and J. Szelhyieds) Materials Research Society Symposium Proceedings Vol. 190, Materials Research Society, Pittsburgh, Pa. (1990) pg. 17.
22. M. R. Jackson, J. R. Rairden, J. S. Smith and R. W. Smith, J. of Metals 33, 23 (1981).
23. Z. Z. Mutasin and R. W. Smith in "Plasma Processing and Synthesis of Materials" (Materials Research Society Symposium Proceedings, Vol. 110) (D. Aperian and J. Szelky, eds) Materials Research Society, Pittsburgh, Pa. (1990) pg. 169.
24. P. R. Taylor, S. A. Pirzada, D. L. Marshall and S. M. Donahue, in "Plasma Synthesis and Processing of Materials" (ed. K. Upadhya) , The Minerals, Metals and Materials Society, Warendale, Pa. pg. 215 (1993).
25. S. L. Girshick, C.-P. Chiu, R. Muno, C. Y. Wu. L. Yang. S. K. Singh and P. H. McMurry, J. Aerosol Sci. 24, 367 (1993).
26. G. J. Vogt and L. R. Newkmk, Proc. Electrochem. Soc. 86, 164 (1986).
27. J. B. Salsman, in "Plasma Synthesis and Processing of Materials" (ed. K. Upadhya), The Minerals, Metals and Materials Society, Warendale, Pa. pg. 155 (1993).
28. C. H. Chou and J. Phillips, J. Materials Res. 7, 2107 (1992).
29. G. P. Vissokov and L. B. Brakolov, J. of Mat. Sci. 18, 2011 (1983).
30. D. P. Zyatkevich, D. D. Pokrovshii, G. R. Makarenka and T. Ya. Kosolapova, IZV. Akad. Nauk SSSR, Neorg. Mater. 15, 599 (1979).
31. A. W. Weimer, G. A. Cochrane, G. A. Eisman and J. P. Henley, Aerosol Sci. & Techn. 19, 491 (1993).
32. A. J. Becker, T. N. Meyer, F. M. Smith, and J. F. Edd, Mat. Res. Symp. Ser. 98, 335 (1987).
33. W. E. Kuhn, J. Electrochem. Soc. 111, 362 (1964).
34. T. M. Ogawa, T. S. Abe, U.S. Pat. No. 4,610,857 (1986).
35. E. G. Bennett, N. A. McKinnon and L. S. Williams, Nature 217, 1287 (1968).
36. G. Thomas and J. Freim, Trans. Am. Mucl. Soc. 21, 182 (1975).
37. L. G. Cordone and W. E. Martinsen, J. Am. Ceram. Soc. 55, 380 (1972).
38. D. L. Johnson and R. A. Rizzo, Cer. Bull. 59, 467 (1980).
39. W. R. L. Masamba, A. H. Ali and J. D. Winefordner, Spectrochimica Acta 47B, 481 (1992).
40. K. Tanabe, H. Haraguchi, and K. Fuwa, Spectrochemica Acta 38B, 49 (1983).
41. M. Boulos, Pure and Appl. Chem. 9, 1321 (1985).

I claim:

1. A method of producing catalytic materials which comprises passing an aerosol comprising a mixture of at least one metal powder and at least one support through a plasma torch.

2. The method of claim 1, wherein the metal powder partially atomizes when passing through the plasma torch and coats the support.

3. The method of claim 1, wherein the support is a refractory material.

4. The method of claim 3, wherein the refractory material is selected from the group consisting of silica, alumina, niobia, magnesia, chromia, titania, ceria, lanthanum oxide, praseodymium oxide, high surface area carbides and nitrides and mixtures thereof.

5. The method of claim 1, wherein the metal powder is selected from the group consisting of manganese, iron, nickel, rhenium, cobalt, copper, zinc, ruthenium, rhodium, palladium, gold, silver, lithium, sodium, potassium, rubidium, cesium, magnesium, calcium, strotium, barium, boron, aluminum and mixture thereof.

6. The method of claim 1, wherein the metal powder is present in an amount of 0.01 to 80 wt %.

7. The method of claim 1, wherein the mixture of metal powder and support is a physical mixture of palladium and carbon.

8. The method of claim 1, wherein the support is present in an amount of 20 to 99.99 wt %.

9. The method of claim 1, wherein the aerosol is a gas aerosol wherein the gas is selected from the group consisting of nitrogen, oxygen, fluorine, neon, chlorine, argon, krypton, xenon, hydrogen and mixtures thereof.

10. The method of claim 1, wherein the inert gas is argon.

11. The method of claim 1, wherein the mixture is an inert gas plasma aerosol that is formed by passing inert plasma gas and mixture of at least one metal and at least one support through a microwave generated inert gas plasma.

12. The method of claim 1, wherein the metal is palladium and the support is alumina, silica and/or carbon.

13. The method of claim 1, wherein the size of the metal powder is 0.05 to 500 microns.

14. The method of claim 1, wherein the mixture comprises 0.01 to 80 wt % metal powder and 20 to 99.99 wt % support.

15. The method of claim 1, wherein the plasma torch is operated between 300 to 1000 Watts with less than 40 w/reflected power.

16. The method of claim 1, wherein a first and a second stream is passed through the plasma torch, the first stream comprising aerosol and the second stream comprising plasma gas, wherein the flow rate of the first and second stream is 1 to 5000 standard liters/min.

17. The method of claim 16, wherein the first and the second stream are fed through the center of a microwave applicator of the plasma torch.

18. The method of claim 1, wherein the average residence time of the aerosol in the applicator is 0.001 to 1000 sec.

19. A method of producing catalytic materials which comprises passing (i) a plasma gas and (ii) an aerosol comprising a mixture of 0.01 to 80 wt % of at least one metal powder selected from the group consisting of Pt, Pd, Fe, V, Cr, Mn, Co, Ni, Cu, Zn, Ru, Rh, Ag, Os, Ir, Au and mixtures thereof and 20 to 99.99 wt % support selected from the group consisting of silica, alumina, niobia, magnesia, chromia, titania, ceria, lanthanum oxide, praseodymium oxide, high surface area carbides and nitrides and mixtures thereof, through a plasma torch at a flow rate of 1 to 5000 standard liters/min. and at a power range of 100 to 1000 watts.

* * * * *